(12) United States Patent
Shi et al.

(10) Patent No.: US 12,055,414 B2
(45) Date of Patent: *Aug. 6, 2024

(54) RANGING SYSTEM AND RANGING METHOD

(71) Applicant: NORTHWEST INSTRUMENT INC., Dover, NJ (US)

(72) Inventors: Xin Shi, Shanghai (CN); David Xing, Dover, NJ (US)

(73) Assignee: NORTHWEST INSTRUMENT INC., Dover, NJ (US)

( * ) Notice: Subject to any disclaimer, the term of this patent is extended or adjusted under 35 U.S.C. 154(b) by 384 days.

This patent is subject to a terminal disclaimer.

(21) Appl. No.: 17/581,470

(22) Filed: Jan. 21, 2022

(65) Prior Publication Data

US 2022/0146279 A1   May 12, 2022

Related U.S. Application Data

(63) Continuation-in-part of application No. 16/656,276, filed on Oct. 17, 2019, now Pat. No. 11,243,309,
(Continued)

(51) Int. Cl.
  *G06T 11/20*   (2006.01)
  *G01B 7/30*    (2006.01)
  (Continued)

(52) U.S. Cl.
  CPC ............ *G01C 22/00* (2013.01); *G01B 7/30* (2013.01); *G01C 9/02* (2013.01); *G06T 11/206* (2013.01); *H04N 5/272* (2013.01); *H04W 4/80* (2018.02)

(58) Field of Classification Search
  None
  See application file for complete search history.

(56) References Cited

U.S. PATENT DOCUMENTS

| 6,532,672 | B1 | 3/2003 | Gottlieb |
| 2003/0037448 | A1 | 2/2003 | Saksa |

(Continued)

FOREIGN PATENT DOCUMENTS

| CN | 2529198 Y | 1/2003 |
| CN | 101206113 A | 6/2008 |

(Continued)

OTHER PUBLICATIONS

Klose et al., DE 19508264, Feb. 1, 1996 (machine translation).
(Continued)

*Primary Examiner* — Yi Wang
(74) *Attorney, Agent, or Firm* — ANOVA LAW GROUP, PLLC

(57) ABSTRACT

A ranging system includes a ranging apparatus, an angle sensor disposed in the terminal device or in the ranging apparatus, and a processor. The ranging apparatus includes a measuring wheel, a rotating shaft disposed on the measuring wheel, and an electronic counter connected to the rotating shaft and configured to obtain distance information, in real time, of a route which the measuring wheel has already traveled. The angle sensor is configured to obtain angle information in real time. The processor is configured to generate a traveling trajectory diagram of the measuring wheel based on the distance information from the electronic counter and the angle information from the angle sensor, and perform optimization processing on the traveling trajectory to generate an optimized trajectory diagram.

20 Claims, 11 Drawing Sheets

Related U.S. Application Data which is a continuation-in-part of application No. 15/503,222, filed as application No. PCT/CN2015/074461 on Mar. 18, 2015, now Pat. No. 10,473,473, and a continuation-in-part of application No. 15/547,939, filed as application No. PCT/CN2016/070454 on Jan. 8, 2016, now Pat. No. 11,069,100.

(51) Int. Cl.
| | | |
|---|---|---|
| *G01C 9/02* | (2006.01) | |
| *G01C 22/00* | (2006.01) | |
| *H04N 5/272* | (2006.01) | |
| *H04W 4/80* | (2018.01) | |

(56) References Cited

U.S. PATENT DOCUMENTS

| | | |
|---|---|---|
| 2005/0219517 A1 | 10/2005 | Tanaka et al. |
| 2006/0070250 A1 | 4/2006 | Siraky et al. |
| 2007/0179645 A1 | 8/2007 | Nixon et al. |
| 2009/0210071 A1 | 8/2009 | Agrusa et al. |
| 2009/0217542 A1 | 9/2009 | Watkins |
| 2010/0321669 A1 | 12/2010 | Yamada |
| 2012/0195491 A1 | 8/2012 | Zhang et al. |
| 2012/0319895 A1 | 12/2012 | Bruchiel |
| 2014/0063510 A1 | 3/2014 | Seifert |
| 2014/0081659 A1 | 3/2014 | Nawana et al. |
| 2014/0267717 A1 | 9/2014 | Pitzer et al. |
| 2014/0317944 A1 | 10/2014 | Kumagai et al. |
| 2015/0123995 A1 | 5/2015 | Zavodny et al. |
| 2015/0205283 A1 | 7/2015 | Brand et al. |
| 2016/0005229 A1 | 1/2016 | Lee et al. |
| 2016/0012643 A1 | 1/2016 | Kezele et al. |
| 2016/0205123 A1 | 7/2016 | Almurayh |
| 2016/0269578 A1 | 9/2016 | Nozawa et al. |
| 2017/0024917 A1 | 1/2017 | Deitrich |
| 2017/0082414 A1 | 3/2017 | Thorp et al. |
| 2017/0102461 A1 | 4/2017 | Tezuka et al. |
| 2017/0108236 A1 | 4/2017 | Guan et al. |
| 2018/0025516 A1 | 1/2018 | Wei et al. |
| 2018/0075643 A1 | 3/2018 | Sequeira et al. |
| 2018/0196522 A1 | 7/2018 | Rochford et al. |
| 2019/0094981 A1 | 3/2019 | Bradski et al. |
| 2019/0369214 A1 | 12/2019 | Shi et al. |
| 2019/0385373 A1 | 12/2019 | Mittleman et al. |
| 2020/0084060 A1 | 3/2020 | Bang et al. |
| 2020/0098191 A1 | 3/2020 | McCall |
| 2020/0192622 A1 | 6/2020 | Stoyles et al. |
| 2020/0249016 A1 | 8/2020 | Shi et al. |
| 2020/0249336 A1 | 8/2020 | Shi et al. |
| 2021/0201378 A1 | 7/2021 | Piramuthu et al. |

FOREIGN PATENT DOCUMENTS

| | | |
|---|---|---|
| CN | 101350153 A | 1/2009 |
| CN | 102236030 A | 11/2011 |
| CN | 102506683 A | 6/2012 |
| CN | 103075963 A | 5/2013 |
| CN | 103234445 A | 8/2013 |
| CN | 203489883 U | 3/2014 |
| CN | 103777204 A | 5/2014 |
| CN | 104111050 A | 10/2014 |
| CN | 104501803 A | 4/2015 |
| CN | 104634222 A | 5/2015 |
| CN | 204514232 U | 7/2015 |
| CN | 206193236 U | 5/2017 |
| DE | 4318939 A1 | 12/1994 |
| DE | 19508264 C1 | 2/1996 |
| DE | 19536597 A1 | 3/1997 |
| DE | 202020105557 U1 | 11/2020 |
| EP | 2796832 A1 | 10/2014 |
| EP | 2824525 A1 | 1/2015 |
| GB | 2513238 A | 10/2014 |
| WO | 0175392 A2 | 10/2001 |
| WO | 2014103989 A1 | 7/2014 |

OTHER PUBLICATIONS

Office Action for Chinese Application No. 201510084983.6, dated May 2, 2018.
Office Action for Chinese Application No. 2016122901860540, dated Jan. 4, 2017.
World Intellectual Property Organization (WIPO) International Search Report for PCT/CN2015/074461 Nov. 10, 2015 2 pages.
World Intellectual Property Organization (WIPO) International Search Report for PCT/CN2016/070454 Oct. 11, 2016 2 pages.
Klose et al., DE 19508264, Feb. 1, 1996 (machine translation) (Year: 1996).
European Patent Office European Search Report for EP22175351 Nov. 22, 2022 11 pages.

before optimization after optimization

RANGING SYSTEM AND RANGING METHOD

CROSS-REFERENCES TO RELATED APPLICATIONS

This present application is a continuation-in-part application of U.S. patent application Ser. No. 16/656,276, filed on Oct. 17, 2019. U.S. patent application Ser. No. 16/656,276 is a continuation-in-part application of U.S. patent application Ser. No. 15/503,222, filed on Sep. 11, 2017 issued as U.S. Pat. No. 10,473,473 on Nov. 12, 2019, which is a national-stage entry of International Patent Application PCT/CN2015/074461, filed on Mar. 18, 2015, which claims priority to Chinese Patent Application 201510084983.6, filed on Feb. 16, 2015. U.S. patent application Ser. No. 16/656,276 further claims priority to U.S. patent application Ser. No. 15/547,939, filed on Aug. 1, 2017 and issued as U.S. Pat. No. 11,069,100 on Jul. 20, 2021, which is a national-stage entry of International Patent Application PCT/CN2016/070454, filed on Jan. 8, 2016, which claims priority to Chinese Patent Application 201610008470.1, filed on Jan. 7, 2016. The entire contents of all above referred patent applications are incorporated herein by reference.

TECHNICAL FIELD

The present disclosure relates to the field of surveying and mapping, and more particularly, to a ranging system and a ranging method.

BACKGROUND

Currently, people to use ranging devices to measure and plan routes and the area in all aspects of life and work, such as in the field of construction, road engineering, transportation, pipeline laying, landscape areas etc. The most commonly used ranging device is a measuring wheel.

The basic principle of a measuring wheel is to calculate a number of rotations based on the rolling of the measuring wheel and with the help of mechanical gear counter or electronic counter, so as to realize distance measurement. A typical measuring wheel only measures a length of a traveling trajectory between two points. Afterwards, drawings need to be created segment by one segment. Thus, this method may be very time consuming and the measurement accuracy may be very low. Therefore, only limited function may be achieved in applications.

SUMMARY

In one aspect of the present disclosure, a ranging system is provided. The ranging system includes a ranging apparatus, an angle sensor disposed in the terminal device or in the ranging apparatus, and a processor. The ranging apparatus includes a measuring wheel, a rotating shaft disposed on the measuring wheel, and an electronic counter connected to the rotating shaft and configured to obtain distance information, in real time, of a route which the measuring wheel has already traveled. The angle sensor is configured to obtain angle information in real time. The processor is configured to generate a traveling trajectory diagram of the measuring wheel based on the distance information from the electronic counter and the angle information from the angle sensor, and perform optimization processing on the traveling trajectory to generate an optimized trajectory diagram. The optimization processing on the traveling trajectory includes: generating the current trajectory diagram by connecting a plurality of sampling points, each sampling point being define by a distance value and an angle value obtained from the electronic counter and the angle sensor; dividing the plurality of sampling points into a plurality of sampling point groups, each sampling point group including a pre-configured number of sampling points; and for each sampling point group, calculating a variance among the angle values of the pre-configured number of sampling points, and removing a stray value from the angle value of each sampling point in the sampling point group. In certain embodiments, the processor is coupled to the ranging apparatus.

In certain embodiments, the processor is disposed at the measuring wheel or the rotating shaft.

In certain embodiments, the ranging apparatus further comprises a holder configured to receive the processor.

In certain embodiments, the processor is further configured to send the optimized trajectory diagram to a display device for display.

In certain embodiments, the display device is included in a terminal device, and the processor is configured to send the optimized trajectory diagram to the display device based on a communication established between the terminal device and the ranging apparatus.

In certain embodiments, the display device is coupled to the ranging apparatus and configured to present the optimized trajectory diagram. The display device is included in the ranging system.

In certain embodiments, the ranging apparatus further comprises a holder configured to fix the display device.

In certain embodiments, the angle sensor is disposed in the ranging apparatus.

In certain embodiments, the angle sensor is disposed in a terminal device; and the processor is further configured to receive the angle information from the angle sensor based on a communication established between the terminal device and the ranging apparatus.

In certain embodiments, the processor is further configured to compare a current traveling trajectory of the measuring wheel with a predesigned traveling trajectory diagram stored in the ranging system, and output deviation data in response to the current traveling trajectory of the measuring wheel deviating from the predesigned traveling trajectory diagram.

In certain embodiments, the ranging system includes a storage device configured to store the predesigned traveling trajectory diagram; and the processor is further configured to perform direction and/or distance prompt based on the deviation data to indicate a user to correct the current traveling trajectory of the measuring wheel.

In certain embodiments, the ranging apparatus further comprises a marker configured to mark on the route of the measuring wheel according to a user instruction or according to a preconfigured rule.

In certain embodiments, the angle sensor is an electronic compass disposed in the ranging apparatus and configured to communicate with the processor.

In certain embodiments, the angle sensor is a gyroscope disposed in the terminal device.

In certain embodiments, the ranging apparatus further comprises a holder configured to fix the terminal device.

In certain embodiments, the ranging system further comprises a camera configured to obtain, in real time, a scene image in a traveling direction of the measuring wheel; and the processor is further configured to display the scene image and provide direction and/or distance prompt on the scene image.

In certain embodiments, the communication between the terminal device and the ranging apparatus is established through one of: a wireless communication channel using a Bluetooth, a WIFI, a Zigbee or an RF communication protocol; or a wired communication channel using an RS232, an RS485, an I2C, an SPI or a CAN protocol.

In certain embodiments, the ranging system further comprises a cloud server communicating with the processor, the cloud server being configured to store and share data sent by the processor. The data sent by the processor includes at least one of: the distance information from the electronic counter, the angle information from the angle sensor, and a first traveling trajectory diagram. The processor is configured to retrieve the predesigned traveling trajectory diagram from the cloud server.

In certain embodiments, the processor is further configured to: in response to the traveling trajectory diagram containing a closed trajectory, calculate an area of the closed trajectory by meshing the closed trajectory and calculating the area of meshes contained by the closed trajectory.

In certain embodiments, the terminal device is one of: a smart cellphone, a computer, or a handheld equipment.

In certain embodiments, the terminal device is configured to generate the optimized trajectory diagram by: dividing the plurality of sampling points into a plurality of sampling point groups, each sampling point group including a pre-configured number of sampling points; and for each sampling point group, calculating a variance among the angle values of the pre-configured number of sampling points, and removing a stray value from the angle value of each sampling point in the sampling point group.

In certain embodiments, the optimization processing on the traveling trajectory further includes: analyzing a change in the angle values between a first sampling point and a second sampling point being adjacent to the first sampling point; in response to the change in the angle values being below a pre-configured threshold angle, adjusting the angle value of the second sampling point to the angle value of the first sampling point; and in response to the change in the angle values being within a pre-configured range about an integer multiples of 45°, adjusting the angle value of the second sampling point so that the change in the angle values is rounded to the integer multiples of 45°.

In certain embodiments, the ranging system further comprises a gravity accelerometer configured to measure a tilt angle; and the processor is further configured to calculate a height at a sampling point according to the measured tilt angle and distance information.

In another aspect of the present disclosure, a ranging method is provided. The ranging method includes: obtaining, by an electronic counter of a ranging apparatus, in real time, distance information which a measuring wheel of the ranging apparatus has already traveled; obtaining, by an angle sensor, in real time, angle information corresponding to the measuring wheel, when the measuring wheel is traveling; obtaining and processing, by a processor coupled to the ranging apparatus, the distance information and the angle information into trajectory data; generating, by the processor, a traveling trajectory diagram of the measuring wheel according to the trajectory data; and performing optimization processing on the traveling trajectory to generate an optimized trajectory diagram.

In certain embodiments, the ranging method further includes: comparing a current traveling trajectory of the measuring wheel with a predesigned traveling trajectory diagram stored on the terminal device; and outputting deviation data in response to the current traveling trajectory of the measuring wheel deviating from the predesigned traveling trajectory diagram.

In certain embodiments, the ranging method further includes: storing the predesigned traveling trajectory diagram in a storage medium; and prompting direction and/or distance based on the deviation data to indicate the user to correct the current traveling route of the measuring wheel.

In certain embodiments, the ranging method further includes: marking, by a maker disposed in the ranging device, on a traveling route of the measuring wheel according to a user instruction or according to a preconfigured rule.

The above aspects will be made clear by the following detailed description and accompanying drawings.

BRIEF DESCRIPTION OF THE DRAWINGS

In order to more clearly illustrate the technical solutions in the embodiments of the present disclosure, the drawings used in the description of the embodiments will be briefly described below. The drawings in the following description are only some embodiments of the present disclosure. Other drawings may be obtained by those of ordinary skill in the art based on these drawings.

FIG. 10 illustrates displaying a trajectory diagram based on ranging measurements over a real-scene photo in.

DETAILED DESCRIPTION

Figure 1:
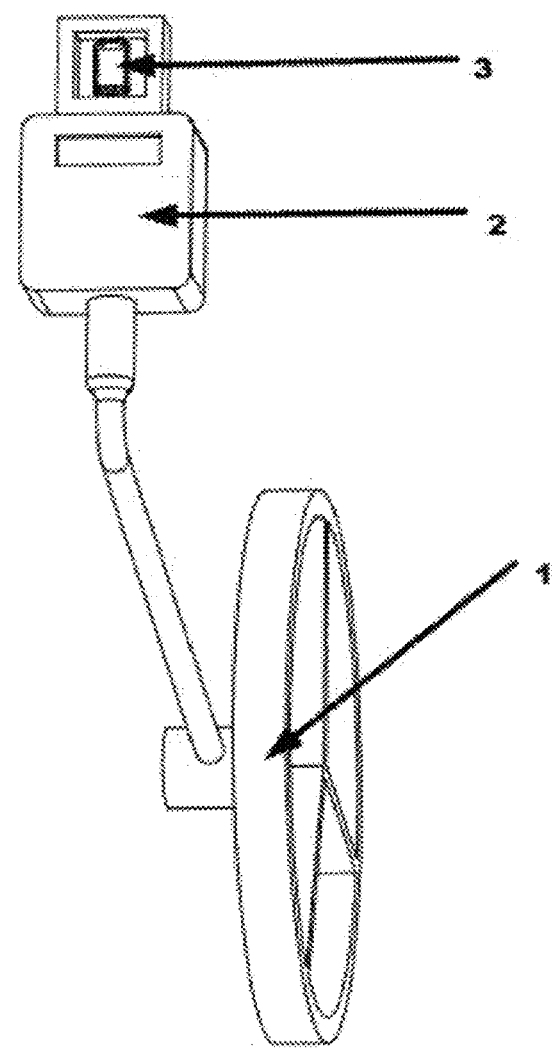
FIG. 1 is a schematic structural view of a ranging system according to an embodiment of the present disclosure.

The technical solutions according to the embodiments of the present disclosure is described in the following with reference to the accompanying drawings. The implementation manners described in the following exemplary embodiments do not represent all embodiments of the present disclosure. Instead, they are merely examples of devices and methods consistent with aspects provided by the present disclosure as detailed in the claims. All other embodiments obtained by a person of ordinary skill in the art based on the embodiments of the present disclosure without creative efforts are within the scope of the present disclosure.

In the present disclosure, relational terms such as "first" and "second" are used merely to distinguish one entity or operation from another entity or operation, and do not necessarily require or imply actual relationship or order between these entities or operations. The terms "comprise", "include", or any other variations intended to cover a non-exclusive inclusion, such that a process, method, article, or device that having a plurality of elements, include not only those elements but also other items not specifically listed elements, or elements that are inherent to such a process, method, item, or device. Unless otherwise limited, an element that is defined by the phrase "comprising a . . . " does not exclude the presence of additional equivalent elements in the process, method, item, or device that comprises the element.

An example ranging system of the present disclosure includes a ranging apparatus, an angle sensor and a processor. The ranging apparatus includes a measuring wheel, a rotating shaft disposed on the measuring wheel, and an electronic counter connected to the rotating shaft and configured to obtain distance information, in real time, of a route which the measuring wheel has already traveled. The angle sensor is configured to obtain angle information corresponding to the ranging system in real time. The processor is configured to generate a traveling trajectory diagram of the measuring wheel based on the distance information from the electronic counter and the angle information from the angle sensor, and perform optimization processing on the traveling trajectory to generate an optimized trajectory diagram.

In some embodiments, the processor is coupled to the ranging apparatus and can obtain the distance information directly from the electronic counter. For example, the processor may be disposed on a rotating shaft, a measuring wheel, or a holder of the ranging apparatus. When angle sensor is also resided in the ranging apparatus, the processor may also obtain the angle information from the angle sensor directly. When the angle sensor is not in the ranging apparatus, the processor is configured to obtain the angle information from the angle sensor via a communication module.

In some other embodiments, the processor is resided in a terminal device capable of communicating with the ranging apparatus. In one embodiment, the terminal device may be in a proximity of the ranging apparatus during a ranging session, such as carried by a staff operating the ranging apparatus, fixed on the ranging apparatus through a device holder. For example, the terminal device may communicate with the ranging apparatus in real time as the ranging apparatus is collecting distance information. Alternatively, in another embodiment, the terminal device may not present during the ranging session, and may communicate with the ranging apparatus after the ranging apparatus has completed the ranging session. In one example, the ranging apparatus may store the distance information and the angle information recorded in a field (e.g., a target physical scene) and later transmit the stored information to the terminal device at another site (e.g., in an office). In another example, the angle sensor may store the angle information in a storage medium, and the processor of the terminal device may obtain angle information from the storage medium.

Figure 3:
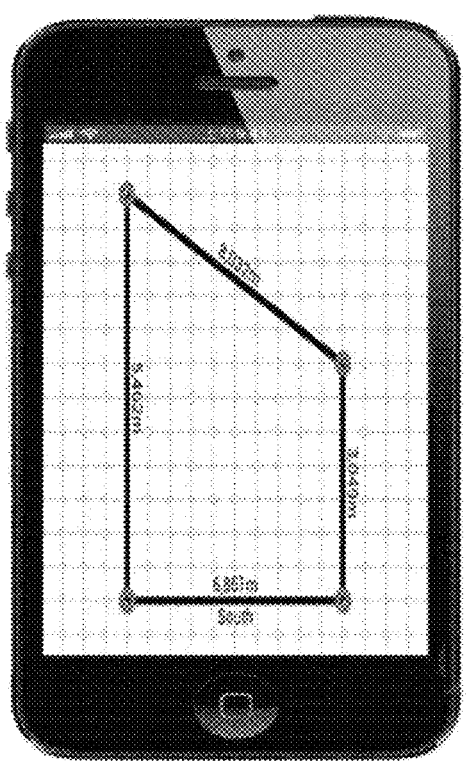
FIG. 3 is a schematic diagram of a regular traveling trajectory diagram generated by a ranging system according to an embodiment of the present disclosure.
Figure 4:
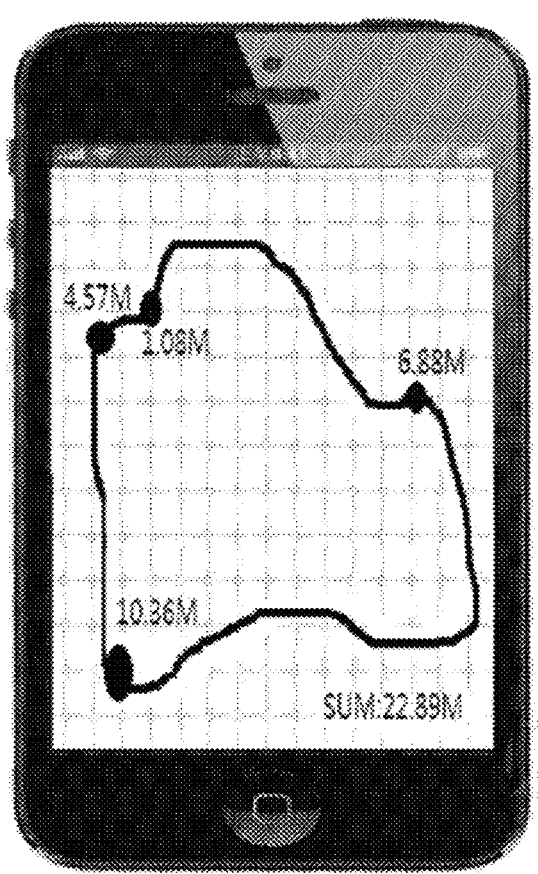
FIG. 4 is a schematic diagram of an irregular and continuous traveling trajectory diagram generated by a ranging system according to an embodiment of the present disclosure.
Figure 6:
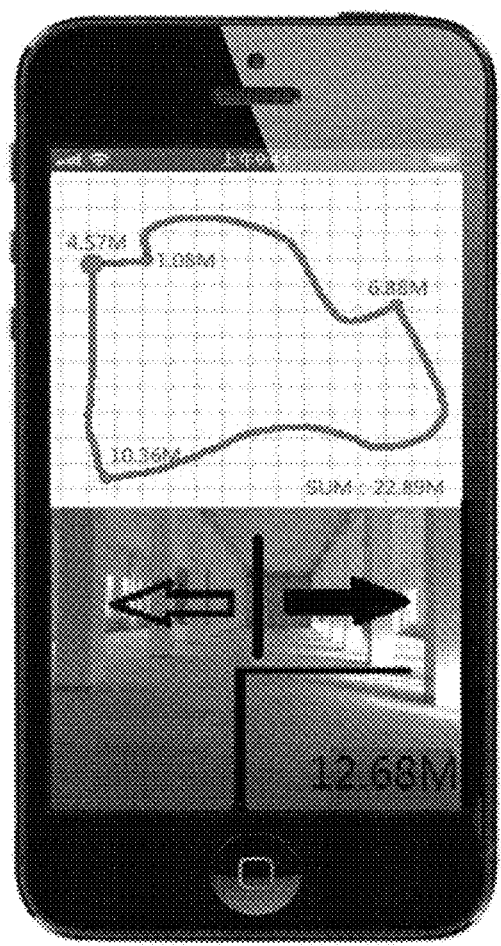
FIG. 6 is a schematic diagram illustrating how the ranging system according to an embodiment of the present disclosure prompts during a traveling process of a measuring wheel.

The optimized trajectory diagram generated by the processor may be presented in a display device. In one embodiment, the display device and the processor are both coupled to or included in the ranging apparatus, and the processor disposed in the ranging apparatus may send the optimized trajectory diagram to the display device to be presented to a user at a time when the optimized trajectory diagram is generated or when a user command of viewing a trajectory is received (e.g., on a touchscreen of the display device). In another embodiment, the display device may be a device external to the ranging apparatus and the processor is disposed in the ranging apparatus, and after the ranging apparatus has completed a measuring session, the display device may be connected to the ranging apparatus and receive the optimized trajectory diagram from the processor disposed in the ranging apparatus for display. In yet another embodiment, the display device and the processor are both included in the terminal device. FIGS. 3, 4 and 6 illustrate example trajectories presented by the display device.

Figure 2:
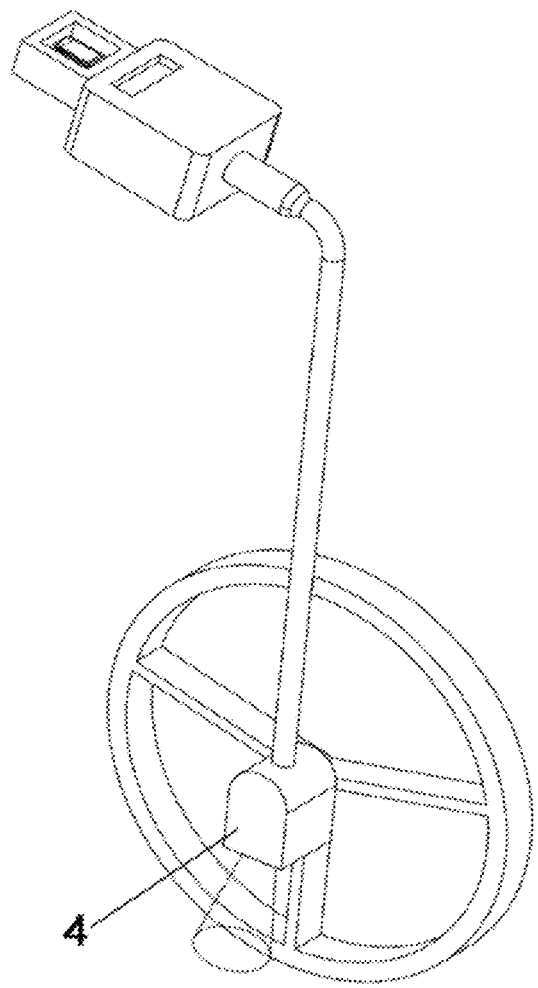
FIG. 2 is a schematic structural view of a ranging system according to another embodiment of the present disclosure.

FIG. 1 is a schematic structural view of a ranging system according to an embodiment of the present disclosure and FIG. 2 is a schematic structural view of a ranging system according to another embodiment of the present disclosure. As shown in FIG. 1, according to certain embodiments, the ranging system may include a ranging apparatus and a terminal device 3. The terminal device 3 may have a processor. The ranging apparatus may include a measuring wheel 1, a rotating shaft disposed on the measuring wheel 1, and an electronic counter connected to the rotating shaft and used to obtain distance information of the measuring wheel. A data processing unit is provided on the terminal device 3. The data processing unit may be implemented by the processor. Communication modules may be arranged both on both the terminal device and the ranging apparatus so that the terminal device and the ranging apparatus may exchange data. In certain embodiments, the ranging apparatus may be equipped with an angle sensor. In certain other embodiments, the angle sensor may be arranged on the terminal device. For example, in certain embodiments of the present disclosure, the angle sensor may be an electronic compass disposed in the ranging apparatus and connected to the communication module of the ranging apparatus. In certain other embodiments the angle sensor may be a gyroscope disposed in the terminal device and connected to the communication module.

Through this communication modules, the terminal device 3 may receive distance information from the electronic counter. The terminal device may further receive angle information from the angle sensor. The data processing unit may perform calculation based on the distance information and the angle information to create, in real time, a traveling trajectory diagram that illustrates a trajectory the measuring wheel has traveled. The terminal device may display the traveling trajectory diagram on a display screen of the terminal device.

The present disclosure combines the application of an electronic counter and an angle sensor to generate a drawing of the traveling trajectory, in real time, by a processor disposed in the terminal device or in the ranging apparatus based on the data measured by the ranging apparatus and the angle sensor. This approach does not only achieve distance measurement, but also generates the diagram of the traveling trajectory in real time. There is no need to perform ranging segment by segment, and create the trajectory diagram in a post-processing step. Thus, work efficiency of the ranging system is effectively improved.

In certain embodiments of the present disclosure, the ranging system may also be used to mark lines or points in a real physical scene, such as on a field or in a construction site. For example, the ranging system may include one or more markers. The marker may be connected to the rotating shaft so that the user may activate the markers to mark points or lines on the traveling route of the measuring wheel on a field or a contraction site. The activation of the markers may be performed by the processor disposed in the ranging apparatus or in the terminal device.

In certain embodiments, a predesigned traveling trajectory diagram may be stored in a storage medium of the ranging apparatus or the terminal device. While the processor is in the process of generating a current traveling trajectory based on the distance information and the angle information, it may compare current traveling trajectory with the predesigned traveling trajectory diagram in real time, and thus monitoring whether the current traveling trajectory deviates from the predesigned traveling trajectory in real time. The processor may also output the deviation between the current traveling trajectory and the predesigned traveling trajectory diagram as deviation data when the current traveling trajectory of the measuring wheel deviates from the predesigned traveling trajectory. The deviation data may be, for example, angle and distance data for which the measuring wheel needs to be adjusted from the current location to the predesigned trajectory. The deviation data may also be displayed on a trajectory diagram.

The terminal device or the ranging apparatus may further comprise a prompt module which receives the above deviation data and is configured to perform direction and/or distance prompt based on the deviation data to indicate the user to correct the current traveling route. In certain embodiments, the predesigned traveling trajectory diagram may indicate certain predesigned marking points or marking lines on the diagram. The prompt module may prompt or indicate the user to use a separate marker to mark points or lines on the traveling route of the measuring wheel based on the locations of the predesigned marking points or marking lines on the predesigned traveling trajectory diagram.

In another embodiment of the present disclosure, a marker may be disposed on the ranging apparatus. For example, the marker may be connected to the rotating shaft so that the user may instruct the marker to mark points or lines at the predetermined location when the prompt module prompts that the current location needs to be marked. The processor disposed in the terminal device or the ranging apparatus may compare the current traveling trajectory to the predesigned traveling trajectory diagram, and if the processor determines that the current location needs to be marked according to the comparison, a marking instruction may be sent to the marker via the communication module, so as to mark points or lines for the measuring site automatically. Referring to FIG. 2, in FIG. 2 a schematic diagram illustrating that the marker 4 is connected to the rotating shaft of the ranging apparatus is shown.

In certain embodiments, based on a predesigned trajectory in a predesigned trajectory diagram, marking lines or points on a field or site may be achieved, and direction and distance information can be prompted to the user.

FIG. 3 shows a regular traveling trajectory diagram generated by a ranging system and displayed on a display device according to an embodiment of the present disclosure. As mentioned before, the display device may be coupled to the ranging apparatus or the terminal device. The regular traveling trajectory diagram may include a plurality of line sections. In certain embodiments, the regular traveling trajectory may be a closed trajectory. FIG. 4 shows an irregular and continuous traveling trajectory diagram generated by a ranging system according to certain embodiments of the present disclosure. The irregular and continuous traveling trajectory may include a continuous curve that may or may not be a closed curve. As shown in FIG. 3 and FIG. 4, the ranging system may continuously measure regular and irregular travel routes and generate the traveling trajectory diagrams in real time.

As shown in FIG. 1 and FIG. 2, a holder for fixing the terminal device 3 and connected to the side end of the electronic counter 2 may be provided in the ranging apparatus. The holder may facilitate the measuring process, maintain a stable signal transmission and avoid the measuring error caused by the angle sensor at the same time. In certain embodiments, the communication modules in the ranging apparatus and the terminal device 3 may be wired communication modules, such as RS 232, RS485, I2C, SPI or CAN. Although FIG. 2 shows that the holder is arranged on the side end of the electronic counter 2, the present disclosure is not limited thereto. The scope of the present disclosure covers all configurations that may stably connect the terminal device 3 to the electronic counter 2. It can be understood that when implementing embodiments of the processor residing in the ranging apparatus, the processor can have a similar configuration as the terminal device 3 shown in FIGS. 1-2. In other words, the reference numeral 3 may be interpreted as terminal device in some embodiments, or may be interpreted as a processor and/or display device belonging to the ranging apparatus in some other embodiments.

Although FIG. 1 and FIG. 2 show the configuration in which the terminal device 3 is fixed on the ranging apparatus via the holder, the present disclosure is not limited thereto. Instead, the terminal device does not have to be fixed on the ranging apparatus to obtain distance information and angle information by the way of wireless communication by using the wireless communication module disposed in the ranging apparatus and the terminal device. The wireless communication module may be implemented with Bluetooth, WIFI, Zigbee or RF protocols.

A storage medium in the ranging system according to the present disclosure may be further used to store distance information, angle information and/or the traveling trajectory diagrams generated by the processor. The stored information may be retrieved later. According to certain embodiments, the terminal device may be a smart cellphone, a tablet, a computer, or a handheld equipment.

Figure 5:
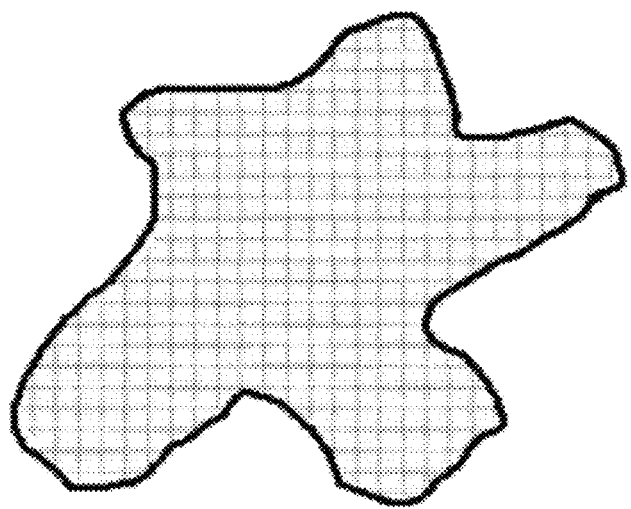
FIG. 5 is a schematic diagram illustrating how the ranging system according to the present disclosure calculates an area of a traveling trajectory by using mesh computing.

As shown in FIG. 5, in certain embodiments of the present disclosure, the processor of the ranging system may be configured to calculate an area of a closed trajectory by meshing the closed trajectory and calculating the area of the meshes contained by the closed trajectory, when the generated traveling trajectory diagram is a closed trajectory, so that an area enclosed by the measured trajectory may be obtained. Generally speaking, the smaller the mesh used when meshing the closed graphic is, the higher the computation accuracy is for area of the closed trajectory.

The ranging system according to the present disclosure may further comprise a cloud server. The processor of the ranging system and the cloud server may be connected to Internet. The cloud server may be used for storing and sharing the data sent by the processor of the ranging system. The data may include: distance information from the electronic counter, angle information from the angle sensor, and/or the generated traveling trajectory diagram. Further, the processor of the ranging system may obtain predesigned traveling trajectory diagram from the cloud server. In this manner, the stored data may be retrieved in real time and the testing data or diagram may be shared with other engineering staff to effectively improve the work quality and efficiency. In certain embodiments, the traveling trajectory generated by the processor of the ranging system and uploaded to the cloud server may be the predesigned traveling trajectory diagram to be obtained.

In certain embodiments, the ranging system may be further provided with a camera configured to take images of a real scene. The processor may combine the scene image obtained by the camera with the trajectory diagram generated by the ranging system and display them on a display device/screen. The processor of the ranging system may be configured to provide the above-mentioned direction and/or distance prompt on the scene image to indicate the user to correct the traveling route and to indicate the user to mark points or lines for a field or a construction site.

When the predesigned traveling trajectory diagram stored in the ranging system or the cloud server is retrieved, a staff member may mark on the actual work site using the one or more markers configured on the ranging system based on the predesigned trajectory in the diagram. Referring to FIG. 6, a trajectory is displayed on a first (top) portion of the display screen. On a second (bottom) portion of the display screen, a prompt for direction deviation (shown as arrows), and a prompt for distance deviation (shown in meters) are combined and displayed on top of the scene image. The traveling trajectory diagram herein may be a predesigned traveling trajectory diagram obtained from the cloud server.

In certain embodiments, the processor of the ranging system may generate a trajectory diagram by connecting a plurality of sampling points, each sampling point being define by distance and angle data obtained from the electronic counter and the angle sensor. A starting point of the trajectory diagram may be selected by a user or from a pre-configured position, such as a center point of the display screen.

Figure 7:
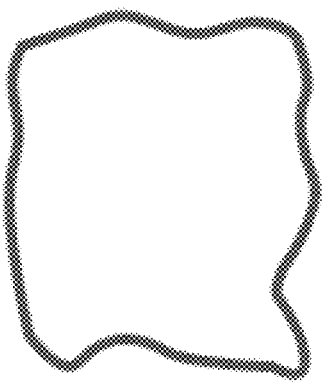
FIG. 7 illustrates an irregular-shaped trajectory generated without optimization, and a regular-shaped trajectory after an optimization processing.
Figure 7:
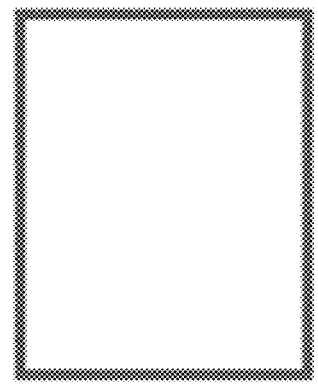

In certain embodiments, during the generation of the trajectory diagram, the processor may perform further processing to optimize the trajectory. For example, the data processor unit may divide plurality of sampling points into a plurality of sampling point groups, each sampling point group including a pre-configured number of sampling points. For each sampling point group, a variance among the angle data of the number of sampling points may be calculated, and a stray value may be calculated according to the calculated variance and removed from the angle data of each sampling point. In certain embodiments, the pre-configured number of sampling points in each sampling point group may be 100. In certain other embodiments, the processor may analyze the difference in the angle data between two adjacent sampling points. If the angle difference between a pair of adjacent sampling points is below a pre-configured threshold angle, the angle value of one of the adjacent may be adjusted so that the angle difference is set to 0°. For example, the pre-configured threshold angle may be within the range of ±(1°-30°), and thus if the angle difference between the first sampling point and the second sampling point is smaller than the threshold angle, the angle value of the second sampling point may be adjusted to be the same as the angle value of the first sampling point. Thus, small variations in angle data can be smoothed out for the optimized trajectory diagram. Further, in certain embodiments, if the angle difference between a pair of adjacent sampling points is within a pre-configured range about an angle of 45°, 90°, 145°, or 180°, the difference may be re-set to that angle of 45°, 90°, 145°, or 180°. Thus, after the optimization, an irregular-shaped trajectory may be processed into a regular-shaped trajectory that is closer to a rectangle shape. Referring to FIG. 7, the left diagram shows an irregular-shaped trajectory generated without optimization, and the right diagram shows a regular-shaped trajectory after the optimization processing.

In certain embodiments, in addition to a first angle sensor configured on the terminal device or the ranging apparatus, the ranging system may include one or more second angle sensors to improve measurement accuracy of the angle data. For example, in certain embodiments, the measuring wheel may be equipped with a gyroscope configured to measure an angle direction of heading direction of the measuring wheel. In certain embodiments, the measuring wheel may be equipped with an electronic compass configured to measure an absolute direction of the measuring wheel. In certain embodiments, the measuring wheel may be equipped with a GPS, a Beidou navigation module, a Galileo system, a mobile communication module, an IoT module, etc. to determine the absolute position of the measuring wheel.

Figure 8:
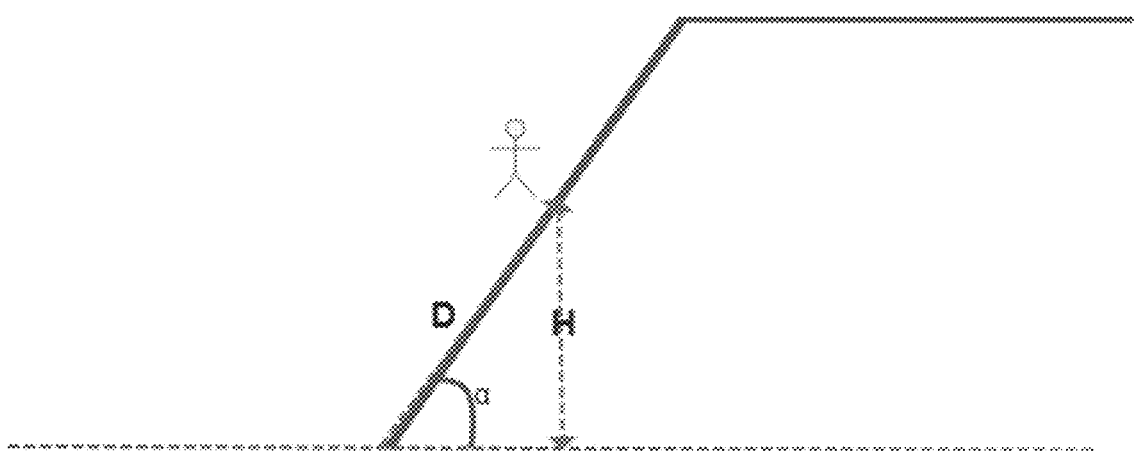
FIG. 8 is a diagram illustrating calculating a height H of a sampling point according to a tilt angle $\alpha$ and a traveled distance D.

In certain embodiments, the ranging system may be configured to further measure altitude or height information, and display the altitude or height information of one or more sampling points. In certain embodiments, the measuring wheel may be equipped with an altitude sensor. In certain embodiments, a gravity accelerometer configured in the measuring wheel device or in the terminal device may detect a tilt angle when the measuring wheel is pushed, so a height at a sampling point may be calculated according to the tilt angle and a traveled distance that has been traveled after the tilt angle changes. Referring to FIG. 8, the height H may be calculated according to the tilt angle α and the traveled distance D based on trigonometry calculation. The above calculation may be implemented by the data processing unit (i.e., processor) of the ranging system. In certain embodiments, the altitude or height information may be acquired by the terminal device using an augmented reality (AR) function available on certain smart devices. In certain embodiments, altitude or height information may be acquired by two or more methods describe above, and an average value may be calculated to improve measurement accuracy.

Figure 9:
FIG. 9 illustrates displaying a trajectory diagram based on ranging measurements over an electronic map.

Referring to FIG. 9, in certain embodiments, the ranging system may use an electronic map, a map screenshot or a real scene picture as a background, and measure and identify the actual positions on the background. The trajectory diagram (shown in the solid line) based on the measurement may be displayed over the background map or real scene photo.

Figure 10:
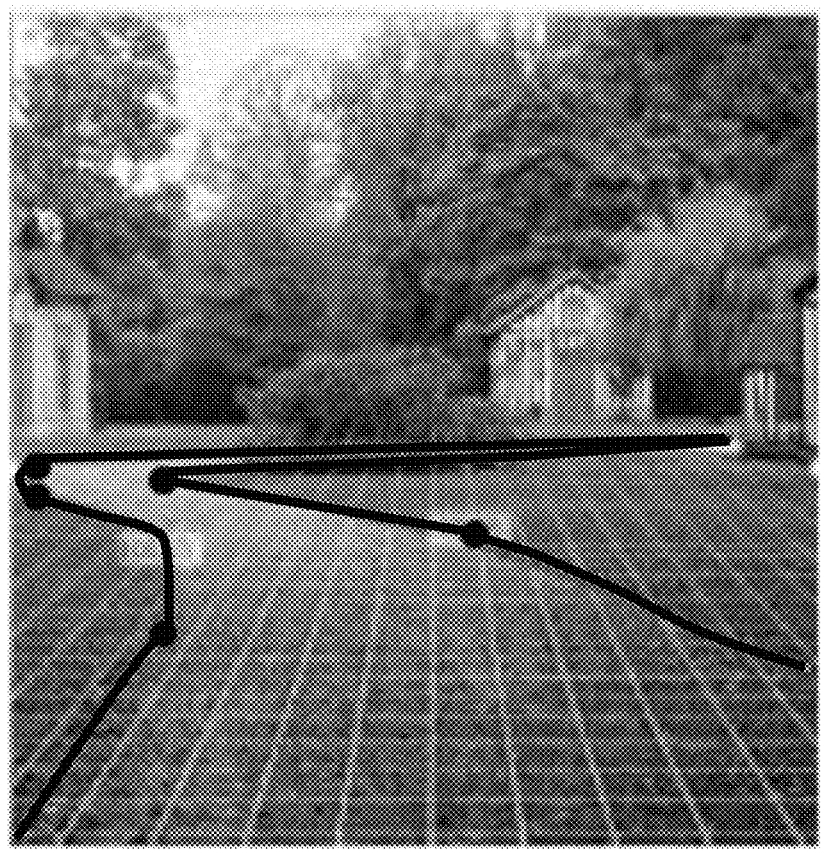

Referring to FIG. 10, in certain embodiments, the trajectory diagram (shown in the solid line) based on the measurement may be displayed over a real scene photo in a perspective view. Critical points (shown in block dots) of the trajectories may be displayed in the diagram. A user may interact with the display interface to adjust a position or a direction of one or more displayed trajectories, for example, by dragging one or more critical points to adjust their positions.

Figure 11:
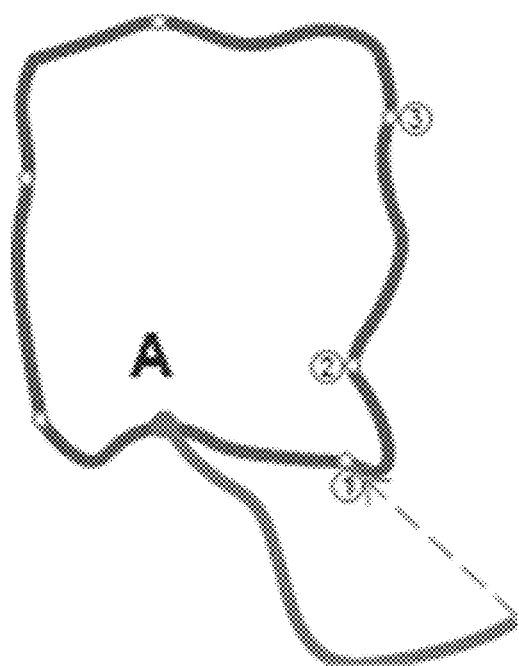
FIG. 11 illustrates a first trajectory diagram generated in a first ranging session and a progress of a second trajectory diagram generated in a second ranging session.

In certain embodiments, the ranging system may be configured to add an identifier to the trajectory diagram at a specific position encountered when generating the trajectory diagram. The identifier may be used to mark a current position that needs to be emphasized or needs follow-up work. In certain embodiments, the generated trajectory diagram and markings may be stored and retrieved later when a user resume the task or start a new task at the same cite. The user may accurately determine a position marked in the previous session based on the distance and angle data provided by the ranging system. Referring to FIG. 11, the closed trajectory is a first trajectory diagram generated by a first session with point A being a starting point. Three positions are marked by identifiers ①, ②, and ③ on the first trajectory diagram. When a second session continues, as long as the starting point A and the starting direction are determined, the ranging system may determine the relative positions of the marked points ①, ②, and ③ according to analysis of the distance and the direction data, and may prompt the user to return to a marked position.

In certain embodiments, the ranging system may be configured to allow a user to add a notation to the trajectory diagram. The notation may be in a form of text, or graphics, or a combination of the two.

In certain embodiments, an electrical generator may be configured on the ranging apparatus. For example, the electrical generator may be powered by mechanical rotations of the measuring wheel to generate electricity. The generated electricity may be used to power one or more electronic components of the ranging system.

In certain embodiments, a lighting component, such as a low-power LED light, may be configured on the measuring wheel. The lighting component may be turned on to improve visualization during operation in the dark.

The present disclosure further provides a ranging method based on the foregoing ranging system. The ranging method may include one or more operations in the foregoing description, and the specific details are not repeated.

Accordingly, the present disclosure provides a ranging system and a ranging method. The disclosed ranging system may perform ranging operation and simultaneously generate a traveling trajectory diagram in real time. A processor of the ranging system may perform optimization processing on the traveling trajectory to generate a high-quality, optimized trajectory diagram. The system may further mark an actual scene such with marking lines or marking points for a predetermined traveling trajectory on a predesigned drawing, and may prompt direction and distance information to a user. The ranging system may also be provided with a camera, and the processor may be configured to combine information recorded by the camera with the trajectory diagram to guide marking lines or points in the real scene, such as on a field or in a construction site. Route correction may also be incorporated in the marking process. In certain applications, the marked points and lines may be saved and used in a new ranging session. Compared to existing ranging devices, the ranging system and method in the present disclosure may coordinate the electronic counter and the angle sensor to generate a diagram of a traveling trajectory, in real time, on the processor by using the data measured by the ranging apparatus, and thus improving work efficiency in ranging and trajectory drafting applications.

The method and apparatus provided by the present disclosure according to the embodiments are described in detail above. The principles and implementation manners provided by the present disclosure are described herein by using specific examples. The description of the above embodiments is only used to help understand the method provided by the present disclosure. At the same time, a person skilled in the art will make changes the specific embodiments and the application scope according to the idea provided by the present disclosure. In summary, the contents of the present specification should not be construed as limiting the present disclosure.

What is claimed is:

1. A ranging system, comprising:
    a ranging apparatus, the ranging apparatus including a measuring wheel, a rotating shaft disposed on the measuring wheel, and an electronic counter connected to the rotating shaft and configured to obtain distance information, in real time, of a route which the measuring wheel has already traveled;
    an angle sensor configured to obtain angle information in real time; and
    a processor coupled to the ranging apparatus and configured to generate a traveling trajectory diagram of the measuring wheel based on the distance information from the electronic counter and the angle information from the angle sensor, and perform optimization processing on the traveling trajectory to generate an optimized trajectory diagram,
    wherein the optimization processing on the traveling trajectory comprises:
        generating the current trajectory diagram by connecting a plurality of sampling points, each sampling point being define by a distance value and an angle value obtained from the electronic counter and the angle sensor;
        dividing the plurality of sampling points into a plurality of sampling point groups, each sampling point group including a pre-configured number of sampling points; and
        for each sampling point group, calculating a variance among the angle values of the pre-configured number of sampling points, and removing a stray value from the angle value of each sampling point in the sampling point group.

2. The ranging system according to claim 1, wherein the processor is disposed at the measuring wheel or the rotating shaft.

3. The ranging system according to claim 1, wherein the ranging apparatus further comprises a holder configured to receive the processor.

4. The ranging system according to claim 1, wherein the processor is further configured to send the optimized trajectory diagram to a display device for display.

5. The ranging system according to claim 4, wherein the display device is included in a terminal device, and the processor is configured to send the optimized trajectory diagram to the display device based on a communication established between the terminal device and the ranging apparatus.

6. The ranging system according to claim 4, wherein:
    the display device is coupled to the ranging apparatus and configured to present the optimized trajectory diagram.

7. The ranging system according to claim 6, wherein the ranging apparatus further comprises a holder configured to fix the display device.

8. The ranging system according to claim 1, wherein the angle sensor is disposed in the ranging apparatus.

9. The ranging system according to claim 1, wherein:
    the angle sensor is disposed in a terminal device; and
    the processor is further configured to receive the angle information from the angle sensor based on a communication established between the terminal device and the ranging apparatus.

10. The ranging system according to claim 9, wherein the ranging apparatus further comprises a holder configured to fix the terminal device.

11. The ranging system according to claim 9, wherein the communication between the terminal device and the ranging apparatus is established through one of:
    a wireless communication channel using a Bluetooth, a WIFI, a Zigbee or an RF communication protocol; or
    a wired communication channel using an RS232, an RS485, an I2C, an SPI or a CAN protocol.

12. The ranging system according to claim 9, wherein the terminal device is one of: a smart cellphone, a computer, or a handheld equipment.

13. The ranging system according to claim 1, wherein:
the ranging apparatus further comprises a marker configured to mark on the route of the measuring wheel according to a user instruction or according to a pre-configured rule.

14. The ranging system according to claim 1, further comprising:
a camera configured to obtain, in real time, a scene image in a traveling direction of the measuring wheel; and
the processor is further configured to display the scene image and provide direction and/or distance prompt on the scene image.

15. The ranging system according to claim 1, wherein the processor is further configured to compare a current traveling trajectory of the measuring wheel with a predesigned traveling trajectory diagram stored in the ranging system, and output deviation data in response to the current traveling trajectory of the measuring wheel deviating from the pre-designed traveling trajectory diagram.

16. The ranging system according to claim 15, further comprising:
a storage device configured to store the predesigned traveling trajectory diagram; and
the processor is further configured to perform direction and/or distance prompt based on the deviation data to indicate a user to correct the current traveling trajectory of the measuring wheel.

17. The ranging system according to claim 1, wherein the processor is further configured to: in response to the traveling trajectory diagram containing a closed trajectory, calculate an area of the closed trajectory by meshing the closed trajectory and calculating the area of meshes contained by the closed trajectory.

18. The ranging system according to claim 1, wherein the optimization processing on the traveling trajectory further comprises:
analyzing a change in the angle values between a first sampling point and a second sampling point being adjacent to the first sampling point;
in response to the change in the angle values being below a pre-configured threshold angle, adjusting the angle value of the second sampling point to the angle value of the first sampling point; and
in response to the change in the angle values being within a pre-configured range about an integer multiples of 45°, adjusting the angle value of the second sampling point so that the change in the angle values is rounded to the integer multiples of 45°.

19. The ranging system according to claim 1, wherein:
the ranging system further comprises a gravity accelerometer configured to measure a tilt angle; and
the processor is further configured to calculate a height at a sampling point according to the measured tilt angle and the distance information.

20. A ranging method, comprising:
obtaining, by an electronic counter of a ranging apparatus, in real time, distance information which a measuring wheel of the ranging apparatus has already traveled;
obtaining, by an angle sensor, in real time, angle information corresponding to the measuring wheel, when the measuring wheel is traveling;
obtaining and processing, by a processor coupled to the ranging apparatus, the distance information and the angle information into trajectory data;
generating, by the processor, a traveling trajectory diagram of the measuring wheel according to the trajectory data; and
performing optimization processing on the traveling trajectory to generate an optimized trajectory diagram, comprising:
generating the current trajectory diagram by connecting a plurality of sampling points, each sampling point being define by a distance value and an angle value obtained from the electronic counter and the angle sensor;
dividing the plurality of sampling points into a plurality of sampling point groups, each sampling point group including a pre-configured number of sampling points; and
for each sampling point group, calculating a variance among the angle values of the pre-configured number of sampling points, and removing a stray value from the angle value of each sampling point in the sampling point group.

* * * * *